(12) United States Patent
Zimmermann

(10) Patent No.: US 10,124,706 B2
(45) Date of Patent: Nov. 13, 2018

(54) GUIDE DEVICE

(71) Applicant: Schock Metallwerk GmbH, Urbach (DE)

(72) Inventor: Joachim Zimmermann, Schorndorf (DE)

(73) Assignee: Schock Metallwerk GmbH, Urbach (DE)

( * ) Notice: Subject to any disclaimer, the term of this patent is extended or adjusted under 35 U.S.C. 154(b) by 0 days.

(21) Appl. No.: 15/451,594

(22) Filed: Mar. 7, 2017

(65) Prior Publication Data

US 2017/0175811 A1     Jun. 22, 2017

Related U.S. Application Data

(63) Continuation of application No. PCT/EP2015/071769, filed on Sep. 22, 2015.

(30) Foreign Application Priority Data

Oct. 2, 2014   (DE) .................. 10 2014 220 049

(51) Int. Cl.
| | |
|---|---|
| *F16C 29/00* | (2006.01) |
| *B60N 2/75* | (2018.01) |
| *A47B 88/487* | (2017.01) |
| *A47B 88/483* | (2017.01) |
| *F16C 29/02* | (2006.01) |
| *F16C 29/10* | (2006.01) |

(52) U.S. Cl.
CPC ............ *B60N 2/773* (2018.02); *A47B 88/483* (2017.01); *A47B 88/487* (2017.01); *F16C 29/002* (2013.01); *F16C 29/02* (2013.01); *F16C 29/10* (2013.01); *F16C 2220/04* (2013.01)

(58) Field of Classification Search
CPC .................................................. A47B 88/047
USPC .................................. 312/333, 319.1; 384/18
See application file for complete search history.

(56) References Cited

U.S. PATENT DOCUMENTS

| | | | |
|---|---|---|---|
| 2,003,549 A | 6/1935 | Miller | |
| 2,534,350 A * | 12/1950 | Gussack | ............ A47B 88/493 312/334.17 |
| RE23,461 E | 2/1952 | Gussack | |
| 6,244,678 B1 * | 6/2001 | Dopp | .................. A47B 88/467 312/333 |

(Continued)

FOREIGN PATENT DOCUMENTS

| | | |
|---|---|---|
| AU | 2009 266488 A1 | 1/2010 |
| CN | 102083341 A | 6/2011 |

(Continued)

*Primary Examiner* — Matthew W Ing
(74) *Attorney, Agent, or Firm* — Aslan Law, P.C.

(57) ABSTRACT

A guide device which is producible in a simple manner and which enables reliable and stable guidance of two elements moveable relative to each other, the guide device comprises a guide rail and a sliding body which is displaceable in sliding manner on the guide rail along a guide direction, Wherein the sliding body comprises at least one pair of mutually oppositely located sliding surfaces with which the sliding body rests on at least one pair of mutually oppositely located contact surfaces of the guide rail, wherein the sliding body comprises a pressing device with the at least one pair of sliding surfaces of the sliding body is pressable onto the at least one pair of contact surfaces of the guide rail.

19 Claims, 16 Drawing Sheets

(56) References Cited

U.S. PATENT DOCUMENTS

| | | |
|---|---|---|
| 7,077,468 B2 | 7/2006 | Maierholzner |
| 8,534,733 B2 | 9/2013 | Schreurs et al. |
| 8,596,899 B2 | 12/2013 | Braun et al. |
| 2004/0108740 A1 | 6/2004 | Maierholzner |
| 2011/0123258 A1 | 5/2011 | Braun et al. |
| 2011/0169288 A1 | 7/2011 | Schreurs et al. |
| 2014/0137776 A1 | 5/2014 | Thomas et al. |

FOREIGN PATENT DOCUMENTS

| | | |
|---|---|---|
| DE | 10 2004 001 568 A1 | 8/2005 |
| DE | 10 2004 010 503 A1 | 9/2005 |
| DE | 10 2006 007 978 A1 | 8/2007 |
| DE | 10 2008 023 246 B4 | 4/2010 |
| DE | 10 2012 105 239 A1 | 12/2013 |
| DE | 10 2013 004 212 B3 | 8/2014 |
| EP | 1 348 593 A2 | 10/2003 |
| EP | 1 470 771 A1 | 1/2004 |
| EP | 1 400 401 A2 | 3/2004 |
| EP | 1 733 916 A2 | 12/2006 |
| FR | 2 914 596 A1 | 10/2008 |
| GB | 401 856 A | 12/1931 |
| GB | 2 487 761 A | 8/2012 |
| JP | 2005 021289 A | 1/2005 |
| NL | 2 001 766 C2 | 1/2010 |
| RU | 2011 103 882 A | 8/2011 |
| WO | WO 2005/035303 A1 | 4/2005 |
| WO | WO 2010/002261 A1 | 1/2010 |

\* cited by examiner

GUIDE DEVICE

RELATED APPLICATION

This application is a continuation of international application No. PCT/EP2015/071769 filed on Sep. 22, 2015, and claims the benefit of German application No. DE 10 2014 220 049.0 filed on Oct. 2, 2014 which are incorporated herein by reference in their entirety and for all purposes.

FIELD OF DISCLOSURE

The present invention relates to a guide device, for furniture and machine parts for example. One application for a guide device can be found on displaceable cover members etc. in the passenger compartment of motor vehicles for example.

SUMMARY OF THE INVENTION

The object of the present invention is to provide a guide device which is producible in a simple manner and which enables two elements that are moveable relative to each other to be guided in a reliable and stable manner.

In accordance with the invention, this object is achieved by a guide device which comprises a guide rail and a sliding body which is displaceable in sliding manner on the guide rail along a guide direction, wherein the sliding body comprises at least one pair of mutually oppositely located sliding surfaces with which the sliding body rests on at least one pair of mutually oppositely located contact surfaces of the guide rail, wherein the sliding body comprises a pressing device by means of which the at least one pair of sliding surfaces of the sliding body is pressable onto the at least one pair of contact surfaces of the guide rail.

Due to the fact that the guide device in accordance with the invention comprises a pressing device, at least one pair of mutually oppositely located sliding surfaces can be pressed against at least one pair of contact surfaces of the guide rail in a reliable and stable manner. The sliding body is thereby receivable and guidable in the guide rail in a stable manner.

In addition, the guide device can preferably be manufactured in a simple manner by the use of the pressing device.

It can be advantageous if the pressing device comprises one or more spring elements by means of which the at least one pair of sliding surfaces of the sliding body is pressable onto the at least one pair of contact surfaces of the guide rail.

One or more spring elements are preferably in the form of insert parts for the purposes of insertion into and/or clamping in a base body of the sliding body.

A spring element may be a metallic spring element for example.

In particular, provision may be made for one or more spring elements to be formed from spring steel.

One or more spring elements can be in the form of leaf springs for example.

As an alternative or in addition thereto, provision may be made for one or more spring elements to be in the form of spiral springs.

It can be expedient if one or more spring elements are formed by a process of shaping a resilient section of a base body of the sliding body.

Provision may be made for the sliding body to comprise a base body which comprises a basic section and one or more pressing sections of the pressing device.

The pressing sections of the pressing device are preferably moveable, and in particular deflectable, automatically relative to the basic section.

Preferably, the sliding body with the one or the plurality of pressing sections is arranged or arrangeable on the guide rail such that it is biased or biasable.

It can be advantageous if the one or the plurality of pressing sections have one or more sliding surfaces.

The sliding body preferably comprises a base body which is formed in one-piece manner.

Furthermore, provision may be made for the sliding body to comprise a base body which is in the form of an injection moulded plastics material component.

The sliding body is formed from an extrudable, sliding and/or self-lubricating plastics material for example.

In particular, an un-reinforced or fibre-reinforced plastics material such as polypropylene or polyamide for example can be provided as the material for the base body.

At least one sliding surface of at least one pair of sliding surfaces is preferably formed by a plurality of sliding points and/or sliding lines. Reliable placement of the sliding body on the guide rail can be achieved in this way and a frictional effect between the sliding body and the guide rail can be reduced at the same time.

Preferably, the sliding body is fixed or fixable to the guide rail with respect to a plurality of planes. The sliding body preferably rests on the guide rail in each of these planes at at least three and in particular at least four contact points or contact lines (sliding points or sliding lines). A stable arrangement and guidance of the base body on the guide rail can thereby be ensured.

It can be advantageous if at least one pair of sliding surfaces of the sliding body comprises mutually remote sliding surfaces.

In correspondence therewith, the associated contact surfaces are preferably mutually facing.

In one arrangement of the sliding surfaces and the contact surfaces of this type, the guide rail preferably embraces the sliding body.

As an alternative or in addition thereto, provision may be made for at least one pair of sliding surfaces of the sliding body to comprise mutually facing sliding surfaces.

In correspondence therewith, the associated contact surfaces of the associated pair of contact surfaces are mutually remote.

In one arrangement of the pair of sliding surfaces and the pair of contact surfaces of this type, the sliding body preferably embraces the guide rail.

Hereby, the guide rail can be in the form of a T- or I-beam for example.

It can be advantageous if the guide rail comprises one or more substantially C-shaped seating sections which preferably embrace the sliding body on three-sides.

In particular, provision may be made for the guide rail to comprise two substantially C-shaped seating sections which are formed and/or arranged to be substantially mirror-symmetrical to each other.

Preferably, two substantially C-shaped seating sections of a guide rail are provided, wherein the openings of the seating sections that are formed by the C-shaping are arranged to be mutually facing.

The guide rail can be formed in one-piece or be formed of a plurality of parts. In particular, the seating sections can be formed together in one-piece manner or be components that differ from one another.

In one embodiment of the invention, provision may be made for the sliding body to comprise a plurality of pairs of sliding surfaces which are arranged opposite each other with respect to different spatial directions.

The spatial directions are preferably oriented transversely and in particular substantially perpendicular to each other.

Furthermore, provision may be made for the spatial directions to be oriented substantially transversely and in particular at least approximately perpendicular to the guide direction.

Provision may be made for the sliding surfaces of a first pair of sliding surfaces to be arranged opposite each other with respect to a first spatial direction. The sliding surfaces of a second pair of sliding surfaces are preferably arranged opposite each other with respect to a second spatial direction. The first spatial direction and the second spatial direction are preferably oriented transversely and in particular substantially perpendicularly to each other. Furthermore, the first spatial direction and the second spatial direction are preferably oriented substantially perpendicularly to the guide direction.

Preferably, the sliding body comprises sliding surfaces which lie in three or more mutually different planes.

One or more pairs of sliding surfaces are preferably arranged on a base body of the sliding body which is formed in one-piece manner.

For example, provision may be made for two, three or more pairs of sliding surfaces, which come to rest on mutually different contact surfaces of the guide rail in the operational state of the guide device, to be arranged on a base body of the sliding body which is formed in one-piece manner.

Furthermore, provision may be made for the base body to comprise a plurality of sliding elements which respectively comprise just one sliding surface of a pair of sliding surfaces and/or which respectively comprise one or more pairs of sliding surfaces.

The sliding elements are preferably connected to one another by means of one or more connecting elements.

In particular, the sliding elements are preferably arranged such as to be spaced from each other.

The one or the plurality of connecting elements for connecting the sliding elements are preferably formed from a material differing from the sliding elements such as a metallic material and in particular steel for example.

It can be expedient if the guide device comprises one or more latching devices by means of which the sliding body is fixable relative to the guide rail in one or more latching positions.

The base body preferably comprises a latching projection which is preferably deflectable by means of a spring element of the latching device.

In particular, provision may be made for the base body to comprise a latching projection which is insertible into a latch seating of the guide rail.

A latch seating of the guide rail can be in the form of a notch for example.

The guide rail preferably comprises one or more latch seatings such as notches for example.

The one or the plurality of latch seatings, in particular notches, are preferably arranged in one or more contact surfaces of the guide rail and in particular, they are distributed such as to be evenly spaced.

As an alternative or in addition to a latching device in which the sliding body comprises a latching projection that is moveable into engagement with a latch seating of the guide rail, provision may be made for the guide device to comprise a latching device with which a latch seating of the sliding body is moveable into engagement with one or more latching projections of the guide rail.

In particular, provision may be made for the base body of the sliding body to comprise a latch seating in which a latching projection of the guide rail is receivable.

To this end for example, the base body may comprise a latch channel which preferably comprises a resilient latching section. The latching section preferably forms the latch seating for accommodating a latching projection of the guide rail.

A latching projection of the guide rail can, for example, be formed by a process of shaping the guide rail during the manufacture thereof. As an alternative thereto, provision may be made for a latching projection to be fixed to the guide rail, for example fixed by reforming with a wobbling tool.

The guide device in accordance with the invention is suitable in particular for use on furniture and/or machine parts.

In particular, the guide device can be used in the automobile construction industry. For example, a moveable central arm rest, a storage compartment cover and/or a sliding element can be provided with such a guide device.

Further preferred features and/or advantages of the invention form the subject matter of the following description and the graphical illustration of exemplary embodiments.

BRIEF DESCRIPTION OF THE DRAWINGS

Similar or functionally equivalent elements are provided with the same reference symbols in all of the Figures.

DETAILED DESCRIPTION OF THE DRAWINGS

Figure 1:
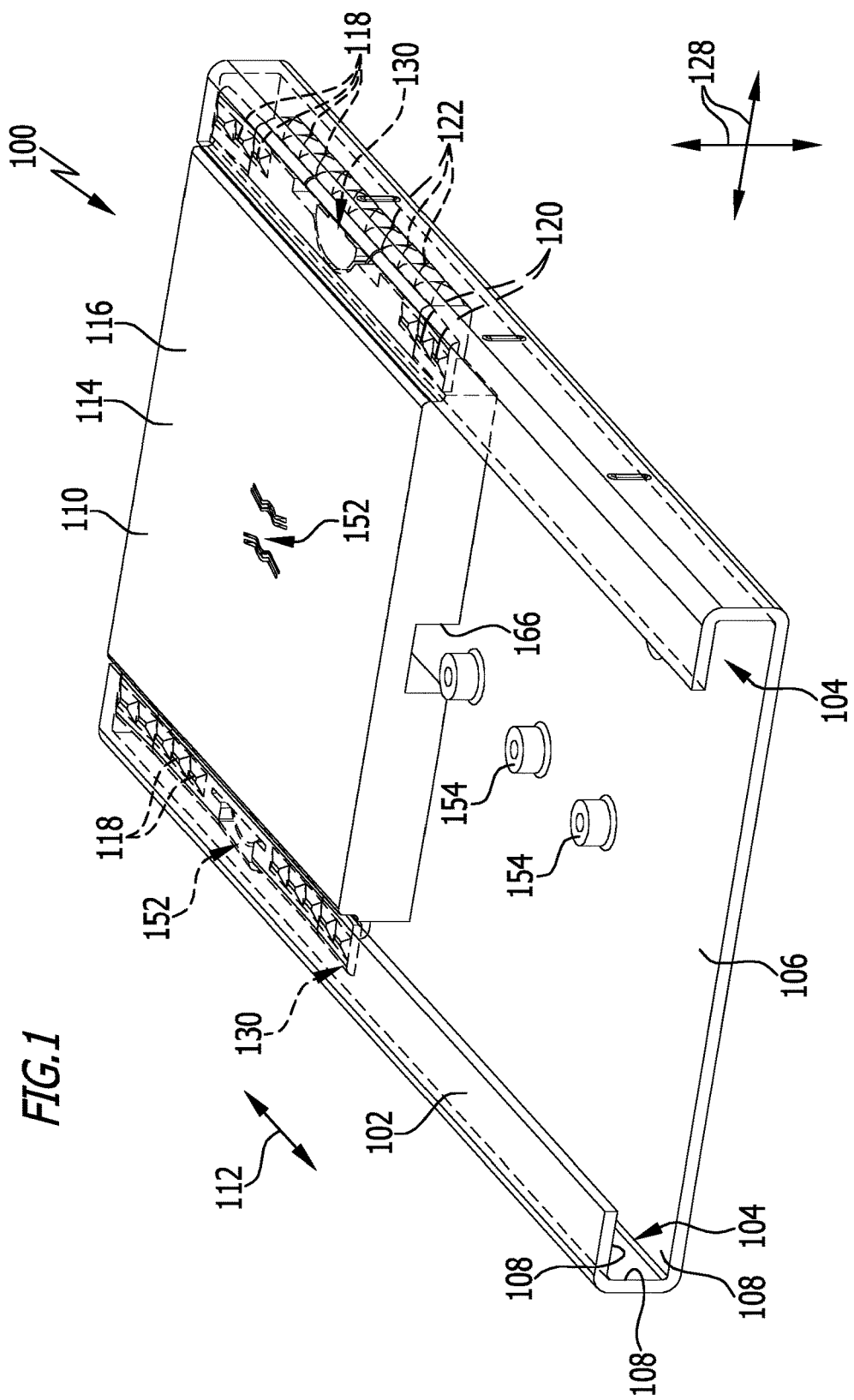
FIG. 1 shows a schematic perspective illustration of a first embodiment of a guide device in which a sliding body is arranged such as to be displaceable along a guide rail of the guide device in sliding manner, wherein the sliding body comprises a one-piece base body and two spring elements in the form of insert parts.
Figure 2:
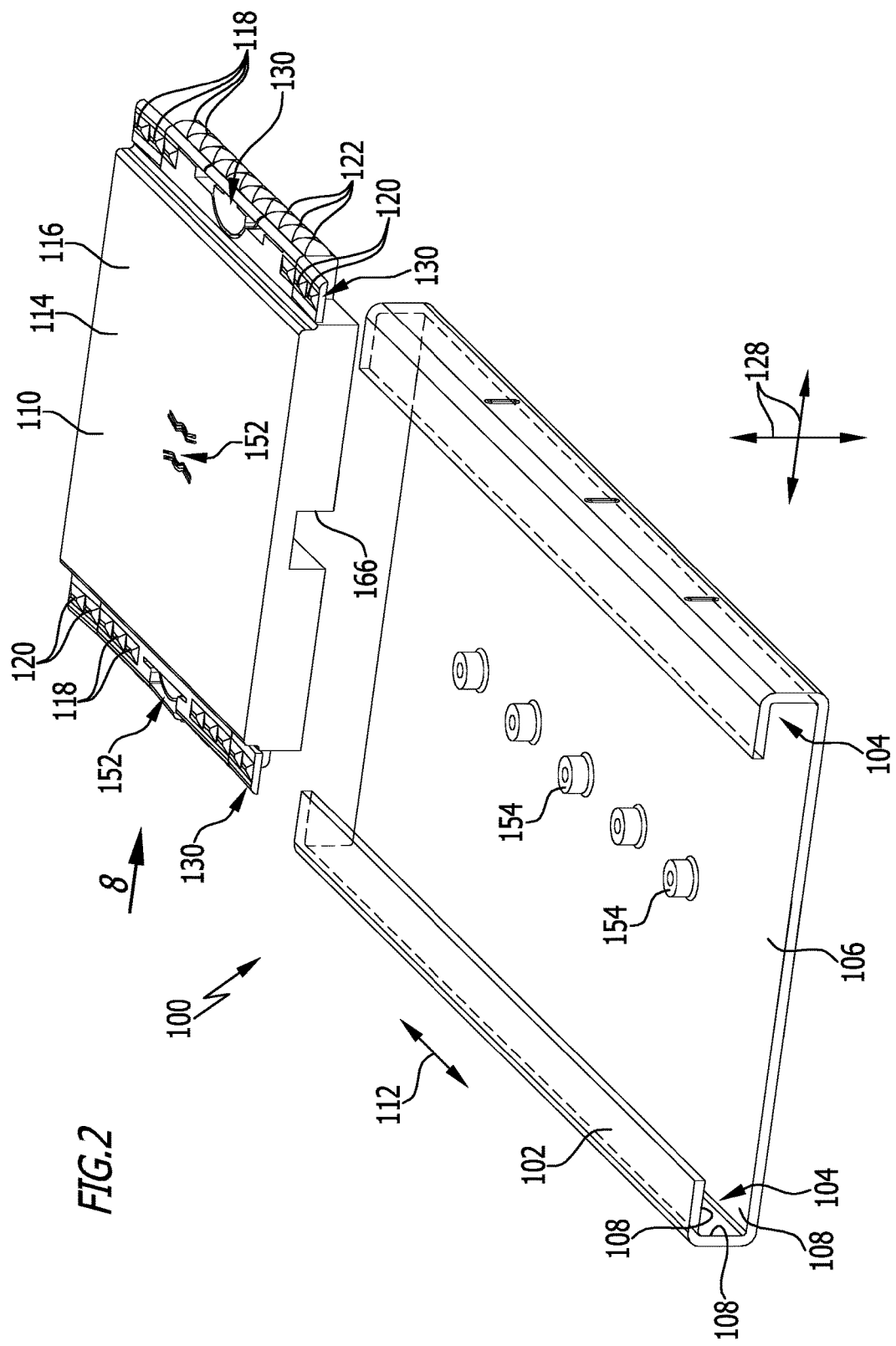
FIG. 2 a schematic perspective illustration of the sliding body and the guide rail depicted in FIG. 1 in the separated state thereof.

A first embodiment of a guide device which is designated as a whole by 100 and is illustrated in FIGS. 1 to 12 serves as an arrangement for the guidance of two elements that are moveable relative to each other. Such a guide device 100 may find application in particular in the automobile construction industry in order to enable covers and other sliding elements to be moved into different positions in a simple and reliable manner.

The guide device 100 comprises a guide rail 102.

The guide rail 102 is a shaped sheet metal product for example. In particular, provision may be made for the guide rail 102 to be formed from a sheet of steel material.

The guide rail 102 preferably comprises two seating sections 104 and a rail back 106 which connects the seating sections 104 to one another.

The seating sections 104 have a substantially C-shaped cross section and form contact surfaces 108 for a sliding body 110 of the guide device 100.

In particular, the sliding body 110 is receivable in the seating sections 104 of the guide rail 102 in guidable manner.

The sliding body 110 is thereby guided in moveable manner in or on the guide rail 102, in particular, along a guide direction 112 of the guide device 100.

The sliding body 110 preferably comprises a base body 114.

For example, the base body 114 is in the form of a one-piece injection moulded component 116 of plastics material and extends in the assembled state of the guide device 100 from one seating section 104 up to the other seating section 104 of the guide rail 102.

The base body 114 has a plurality of sliding surfaces 118 with which the base body 114 rests on the contact surfaces 108 of the seating sections 104 of the guide rail 102.

Hereby, the sliding surfaces 118 are formed by sliding lines 120 or sliding points 122 for example. To this end in particular, the base body 114 has projections wherein the ends thereof facing the contact surfaces 108 are in the form of a line or are point-like.

Figure 3:
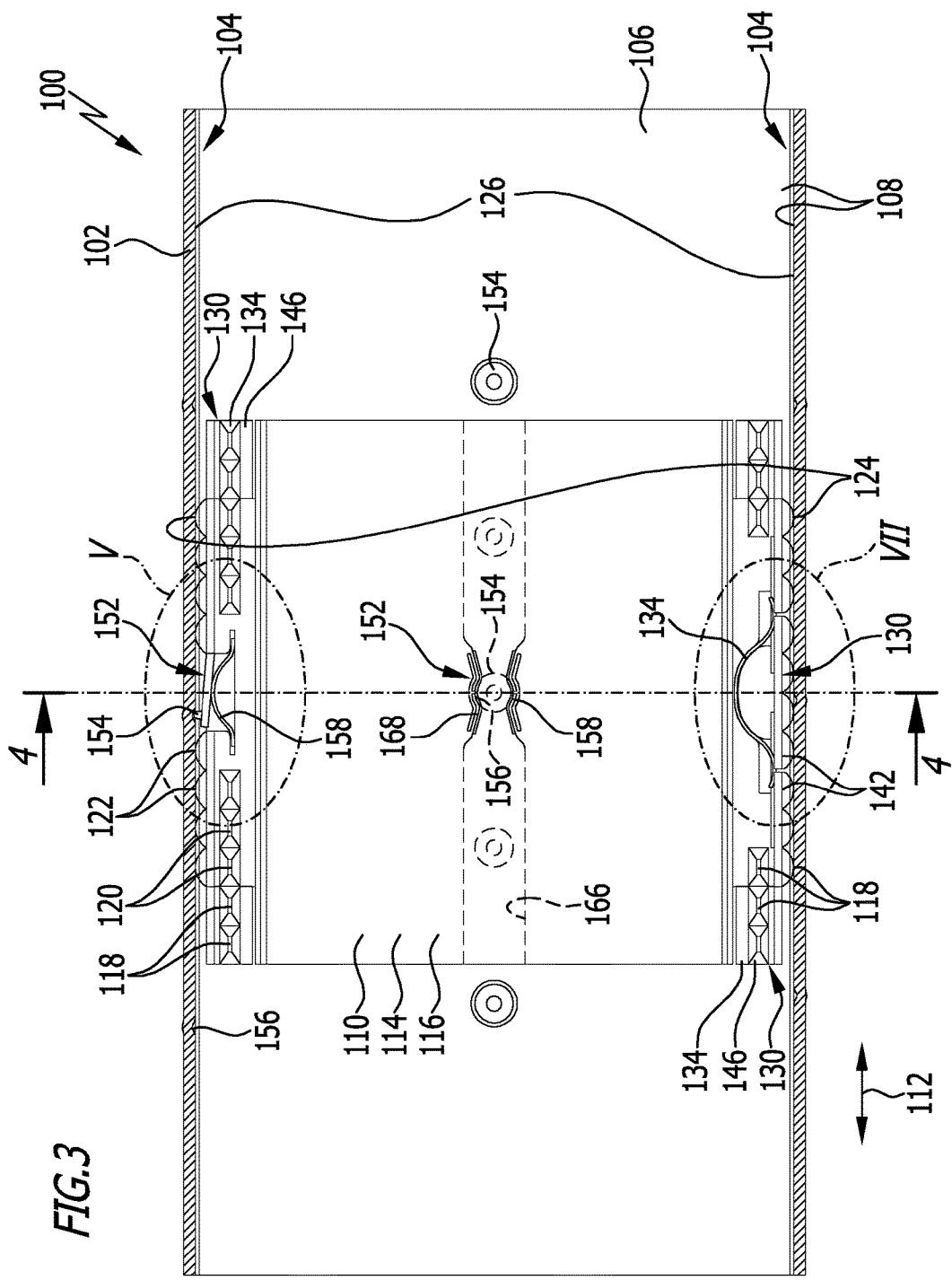
FIG. 3 a schematic plan view of an upper surface of the guide device depicted in FIG. 1, wherein the sliding body is arranged on the guide rail in an alternative latching position.
Figure 4:
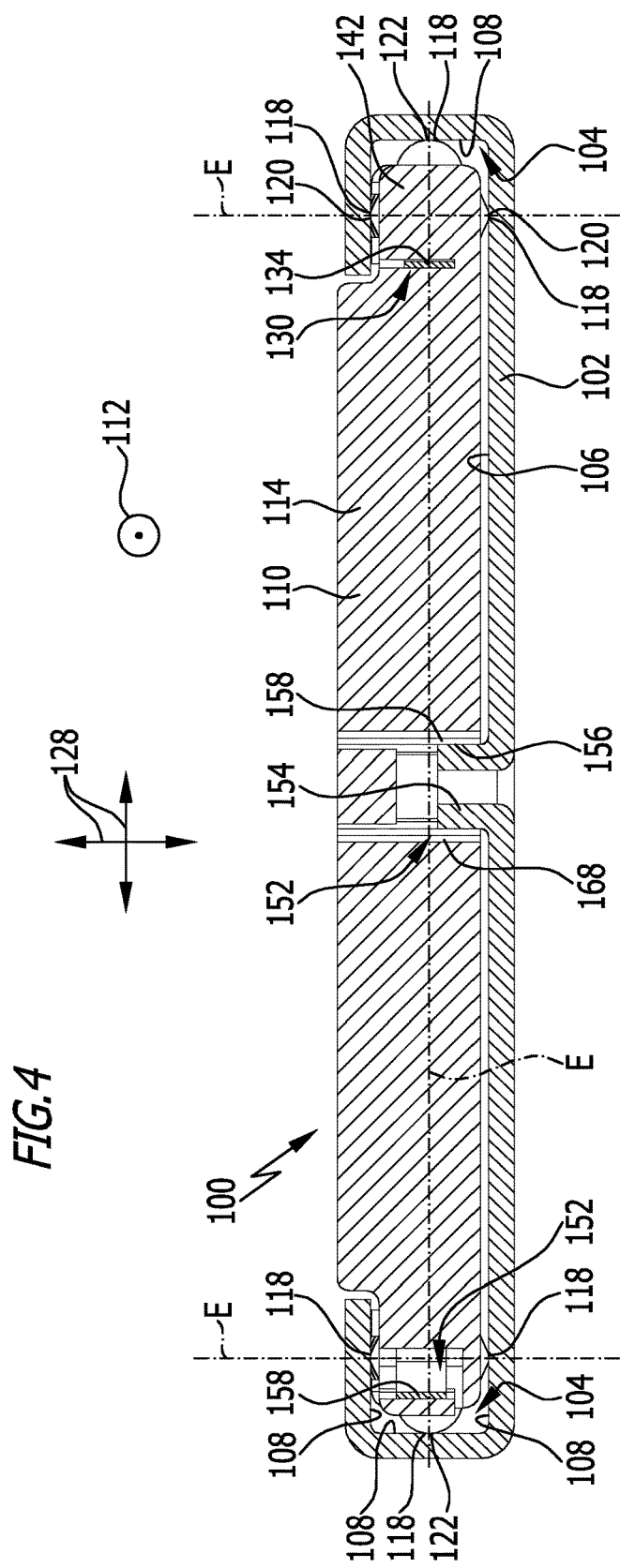
FIG. 4 a schematic section through the guide device depicted in FIG. 1 along the line 4-4 in FIG. 3.
Figure 5:
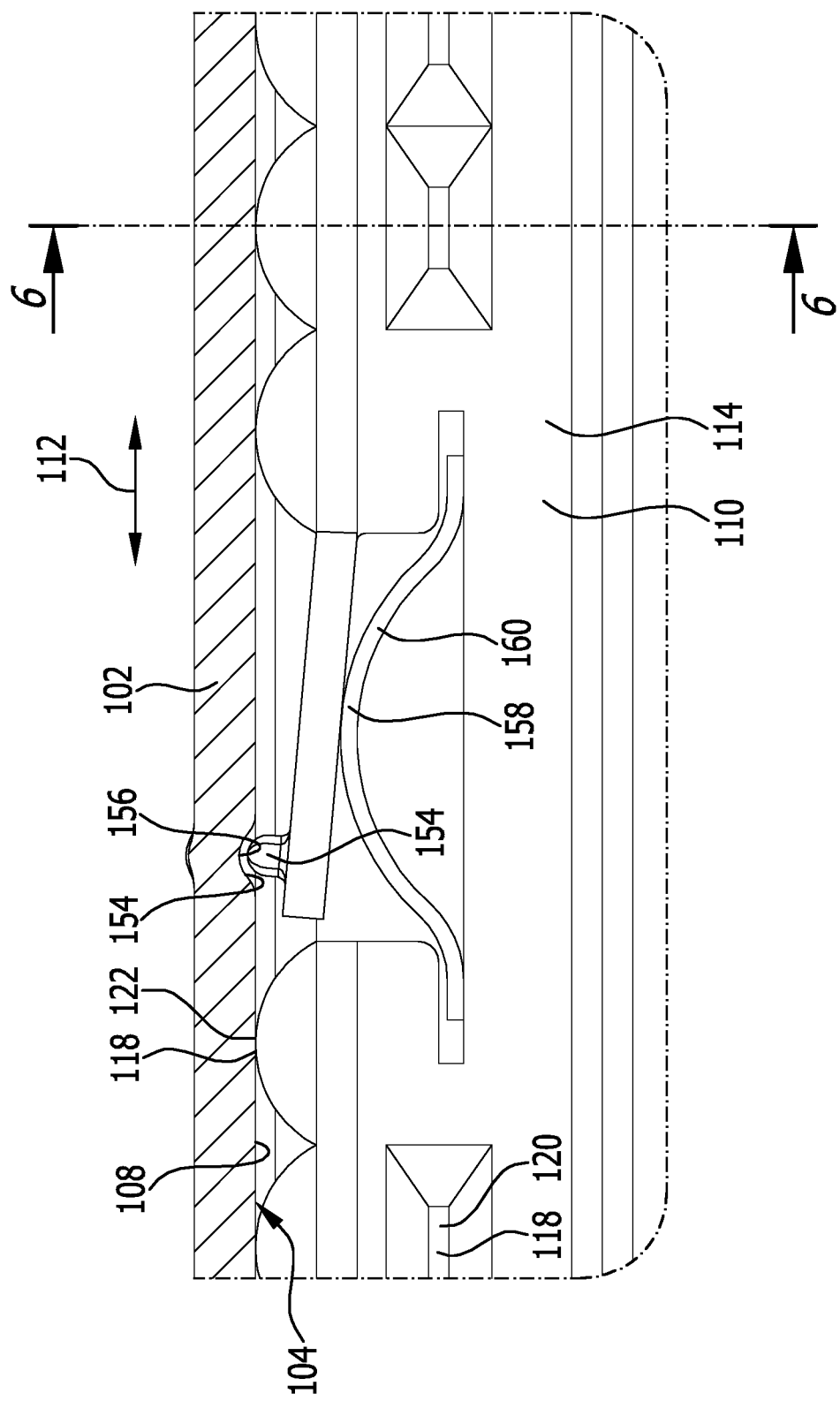
FIG. 5 an enlarged illustration of the region V in FIG. 3.
Figure 6:
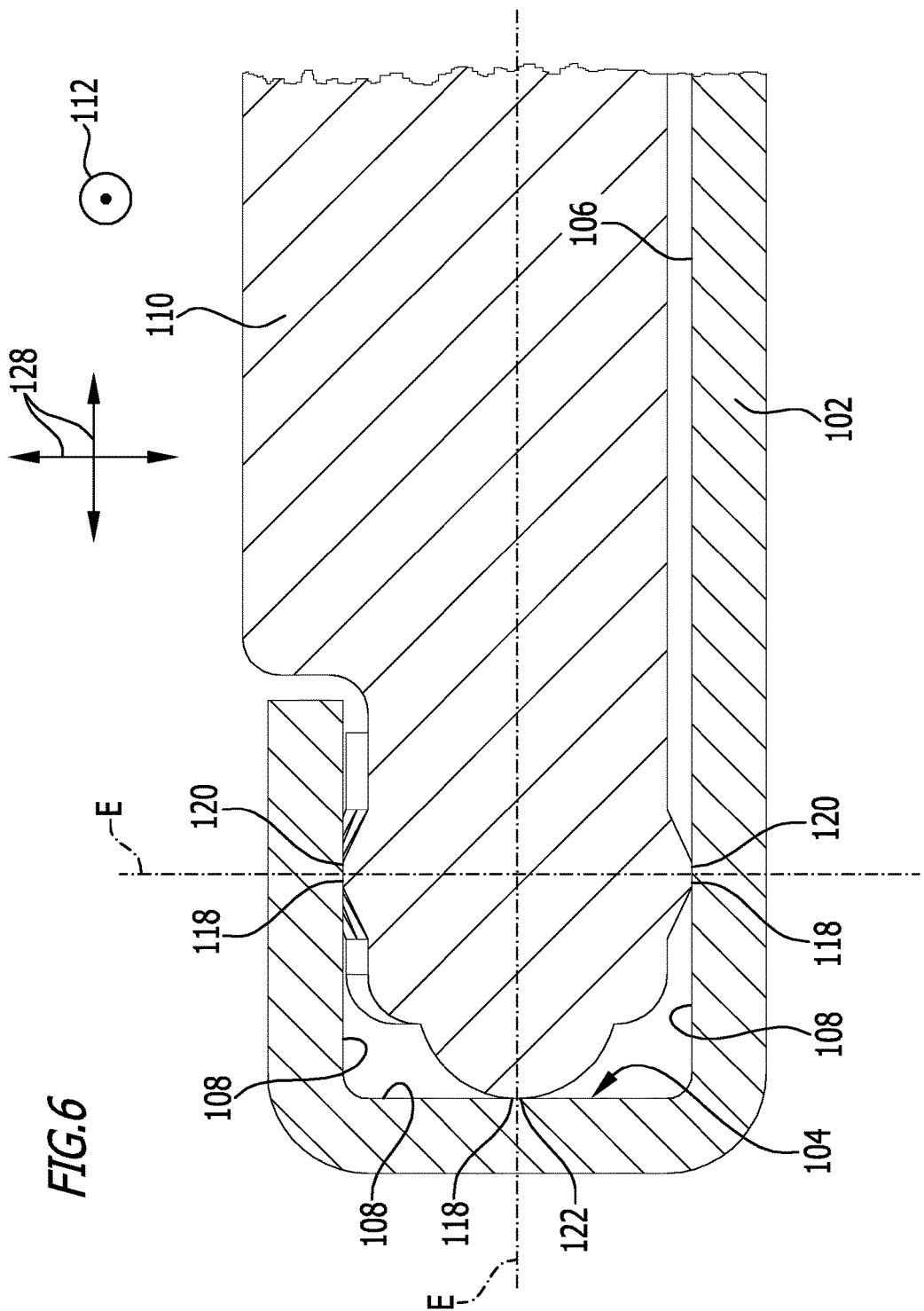
FIG. 6 a schematic section through the enlarged section depicted in FIG. 5 along the line 6-6 in FIG. 5.

As can be derived from FIGS. 3 and 4 in particular, the sliding body 110 comprises a plurality of pairs 124 of sliding surfaces 118.

Hereby, each pair 124 of sliding surfaces 118 comprises two or more mutually oppositely located sliding surfaces 118.

In the first embodiment of the guide device 100 illustrated in FIGS. 1 to 12, the sliding surfaces 118 of each pair 124 of sliding surfaces 118 are arranged on mutually remote sides of the base body 114 and are thus themselves remote from one another.

The associated contact surfaces 108 of the guide rail 102 are likewise provided in pairs in order to accommodate the pairs 124 of sliding surfaces 118.

Thus in particular, there are provided pairs 126 of contact surfaces 108 which comprise mutually oppositely located contact surfaces 108.

In the first embodiment of the guide device 100 illustrated in FIGS. 1 to 12, the contact surfaces 108 of the pair 126 of contact surfaces 108 are arranged to be mutually facing.

For the purposes of seating the sliding body 110 in the guide rail 102 in a stable manner, there are provided three pairs 124 of sliding surfaces 118 and correspondingly, three pairs 126 of contact surfaces 108 for example.

In particular in the case of substantially point-like or line-like sliding surfaces 118, all of the sliding surfaces 118 of a pair 124 of sliding surfaces 118 preferably lie in a plane E.

As can be derived from FIG. 4 in particular, there are provided three planes E for example, wherein two of the planes E run in parallel with each other and are arranged such as to be perpendicular to the third plane E.

In each case thereby, one plane E runs through only one respective seating section 104. The further plane E intersects both seating sections 104.

As can be derived from FIG. 3 in particular, a pair 124 of sliding surfaces 118 is to be understood as the arrangement of a plurality of mutually oppositely located sliding surfaces 118, and in particular, independently of how many individual sliding surfaces 118 are arranged on each of the sides.

In the case of a pair 124 of sliding surfaces 118 in the first embodiment of the guide device 100 illustrated in FIGS. 1 to 12 for example, there are provided eight sliding surfaces 118 on one side and ten sliding surfaces 118 on the other side (see FIG. 3). Nevertheless, independently of the respective number, there is only one pair 124 of sliding surfaces 118.

Figure 8:
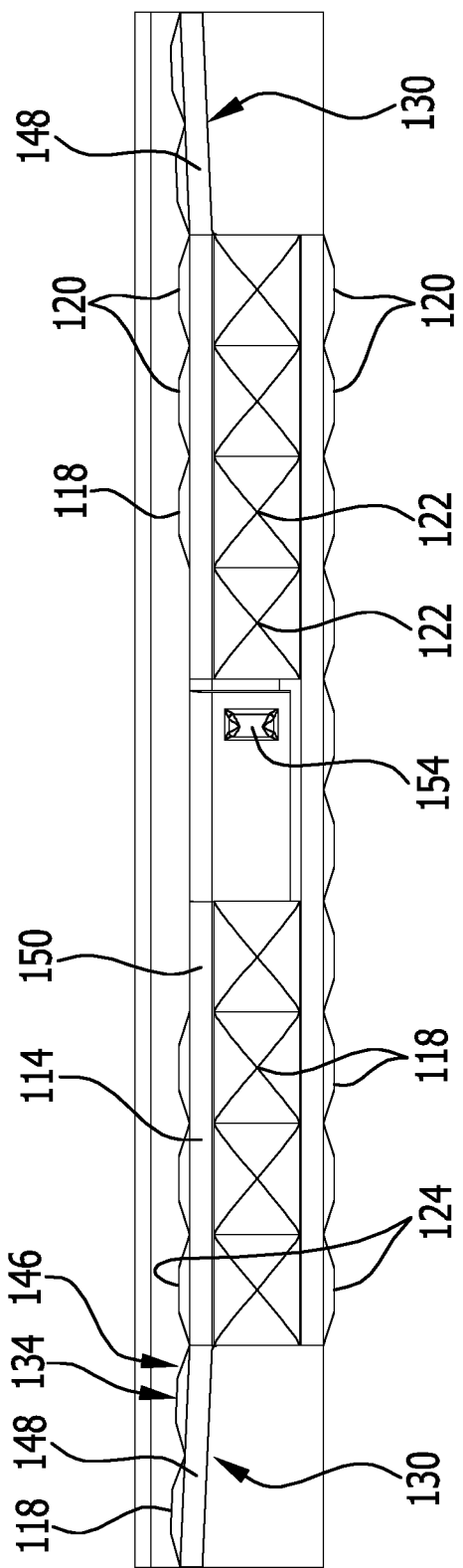
FIG. 8 a schematic side view of the sliding body depicted in FIG. 1 as viewed in the direction of the arrow 8 in FIG. 2.

Furthermore, as can be derived from FIG. 8, provision could also be made for one pair 124 of sliding surfaces 118 to have an equal number of sliding surfaces 118 per side. Thus for example, ten sliding surfaces 118 per side are provided for a pair 124 of sliding surfaces 118 which is arrangeable in its entirety in one of the seating sections 104 of the guide rail 102.

As can be derived from FIG. 4 in particular, the sliding surfaces 118 of the three pairs 124 of sliding surfaces 118 are arranged to be located such that they are mutually opposite with respect to differing spatial directions 128. Hereby, these spatial directions 128 are oriented substantially perpendicular to the guide direction 112 so that the sliding body 110 is displaceable in the guide rail 102 along the guide direction 112.

In dependence on the choice of material and the design of the guide rail 102 and the sliding body 110, unwanted play between the sliding surfaces 118 and the contact surfaces 108 can occur.

In order to reduce or completely eliminate this play, there is provided a pressing device 130 in the first embodiment of the guide device 100 illustrated in FIGS. 1 to 12.

The pressing device 130 serves to press mutually oppositely located sliding surfaces 118 of one or more pairs 124 of sliding surfaces 118 onto the associated contact surfaces 108.

Figure 7:
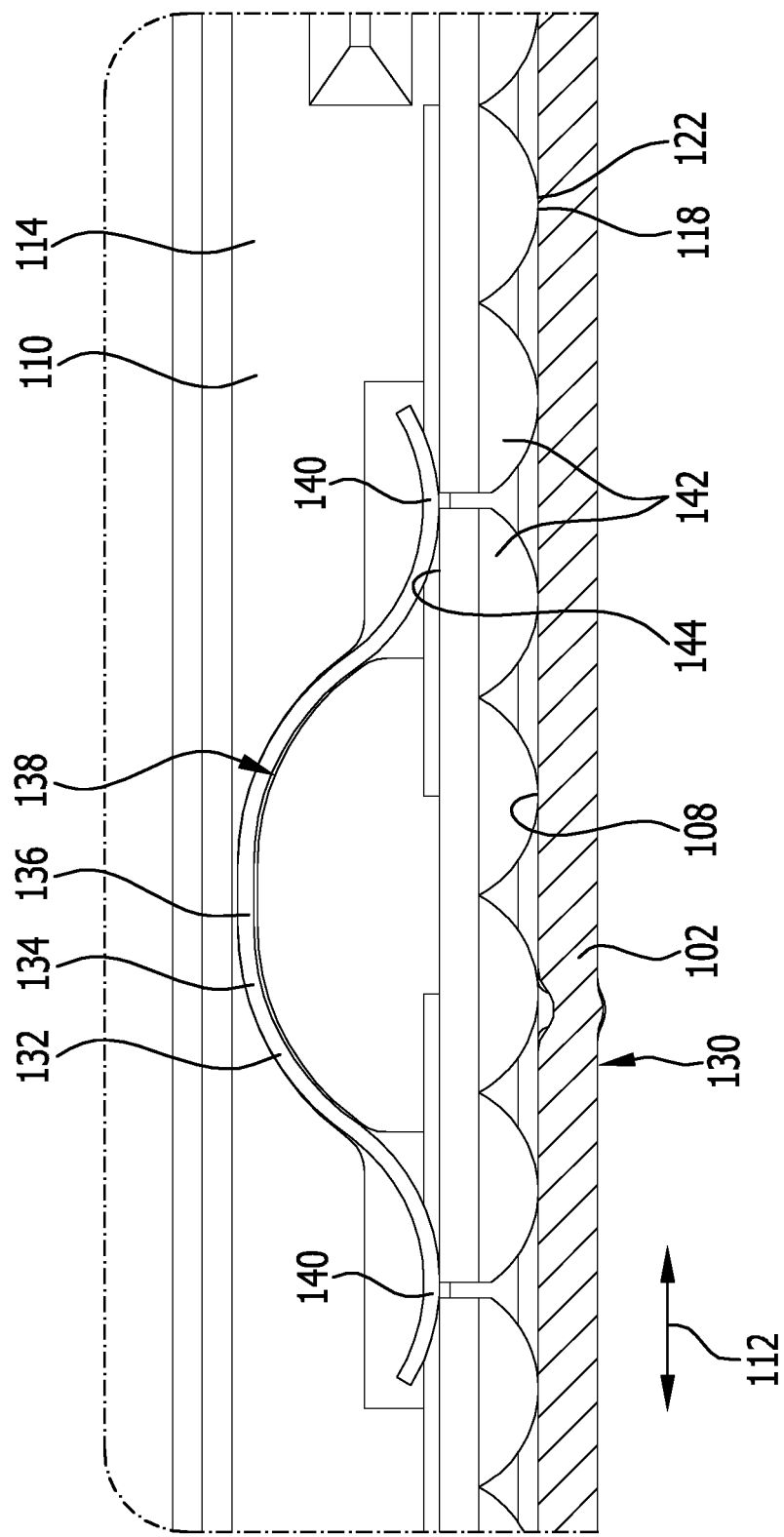
FIG. 7 an enlarged illustration of the region VII in FIG. 3.
Figure 10:
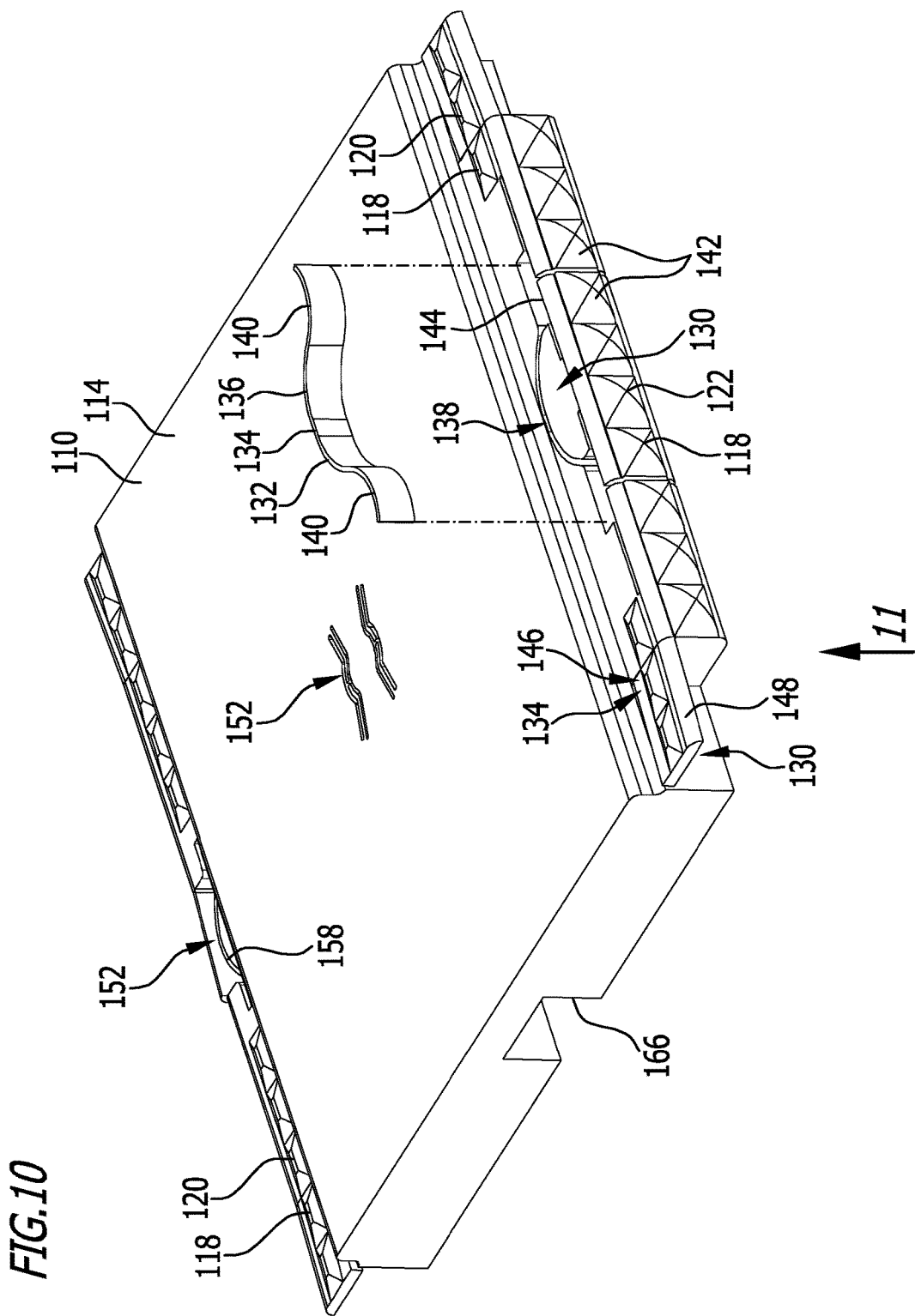
FIG. 10 a schematic perspective illustration of the sliding body and of a spring element of a pressing device of the guide device that is yet to be inserted.

As can be derived from FIGS. 7 and 10 in particular, the sliding body 110 comprises a spring element 134 which is in the form of an insert-part 132 that is insertible into the base body 114 of the sliding body 110 and in particular, is clampable therein.

In particular, the spring element 134 is in the form of a leaf spring 136 that is arrangeable in a seating groove 138 in the base body 114.

The spring element 134 comprises one or more resilient sections 140 which respectively act on one or more deflecting sections 142 of the sliding body 110.

In particular, the deflecting sections 142 are deflecting sections 142 of the base body 114 and respectively comprise one or more sliding surfaces 118.

A resilient section 140 of the spring element 134 preferably acts on the deflecting sections 142 from the rear face 144 thereof which is remote from the sliding surfaces 118 in order to press or force the deflecting sections 142 and thus the sliding surfaces 118 toward the contact surfaces 108.

The spring element 134 is preferably mounted with bias on the base body 114 so that the deflecting sections 142 can preferably be moved out from their rest position and thus be reliably pressed or forced against the contact surfaces 108.

The pressing device 130 may comprise a plurality of spring elements 134 for each pair 124 of sliding surfaces 118.

However, as in the case of the first embodiment of the guide device 100 illustrated in FIGS. 1 to 12, it may also suffice to provide just one side of a pair 124 of sliding surfaces 118 with a spring element 134 of the pressing device 130 since, by suitable dimensioning, the entire sliding body 110 can also be reliably clamped between the contact surfaces 108 and thus guided in play-free manner using only one spring element 134.

Furthermore, as can be derived from FIGS. 8 to 11 in particular, the guide device 100 may comprise a pressing device 130 which comprises a spring element 134 that is formed by suitable shaping and choice of material of the base body 114 of the sliding body 110.

For example, provision may be made for a resilient section 146 of the base body 114 to be provided which forms a pressing section 148 for example.

The pressing section 148 is provided with sliding surfaces 118 and is inclined away from a basic section 150 of the base body 114 for example.

In particular thereby, the pressing section 148 is inclined away from the basic section 150 in that direction in which the sliding surfaces 118 are placed on the contact surfaces 108.

Thereby, due to the resilient section 146 and the shaping of the pressing section 148, reliable placement of the sliding surfaces 118 on the contact surfaces 108 can also be ensured, whereby a biasing effect can preferably be obtained by means of the resilient section 146.

Two resilient sections 146 and pressing sections 148 are preferably provided per pair 124 of sliding surfaces 118 in order to obtain a uniform pressing effect and prevent unwanted tilting of the base body 114 relative to the guide rail 102.

The sliding body 110 of the guide device 100 is preferably fixable and in particular lockable relative to the guide rail 102 in a plurality of different positions.

To this end, the guide device 100 comprises one or more latching devices 152 by means of which the sliding body 110 and the guide rail 102 are latchable to one another.

For example, the latching device 152 can be a latching device 152 in which a latching projection 154 of the sliding body 110 is moveable into a latch seating 156 of the guide rail 102.

As can be derived from FIGS. 3, 5, 8 and 9 in particular, in the case of such a latching device 152 for example, there is provided a spring element 158 and in particular a leaf spring 160 by means of which the latching projection 154 can be pressed towards the latch seating 156.

Figure 9:
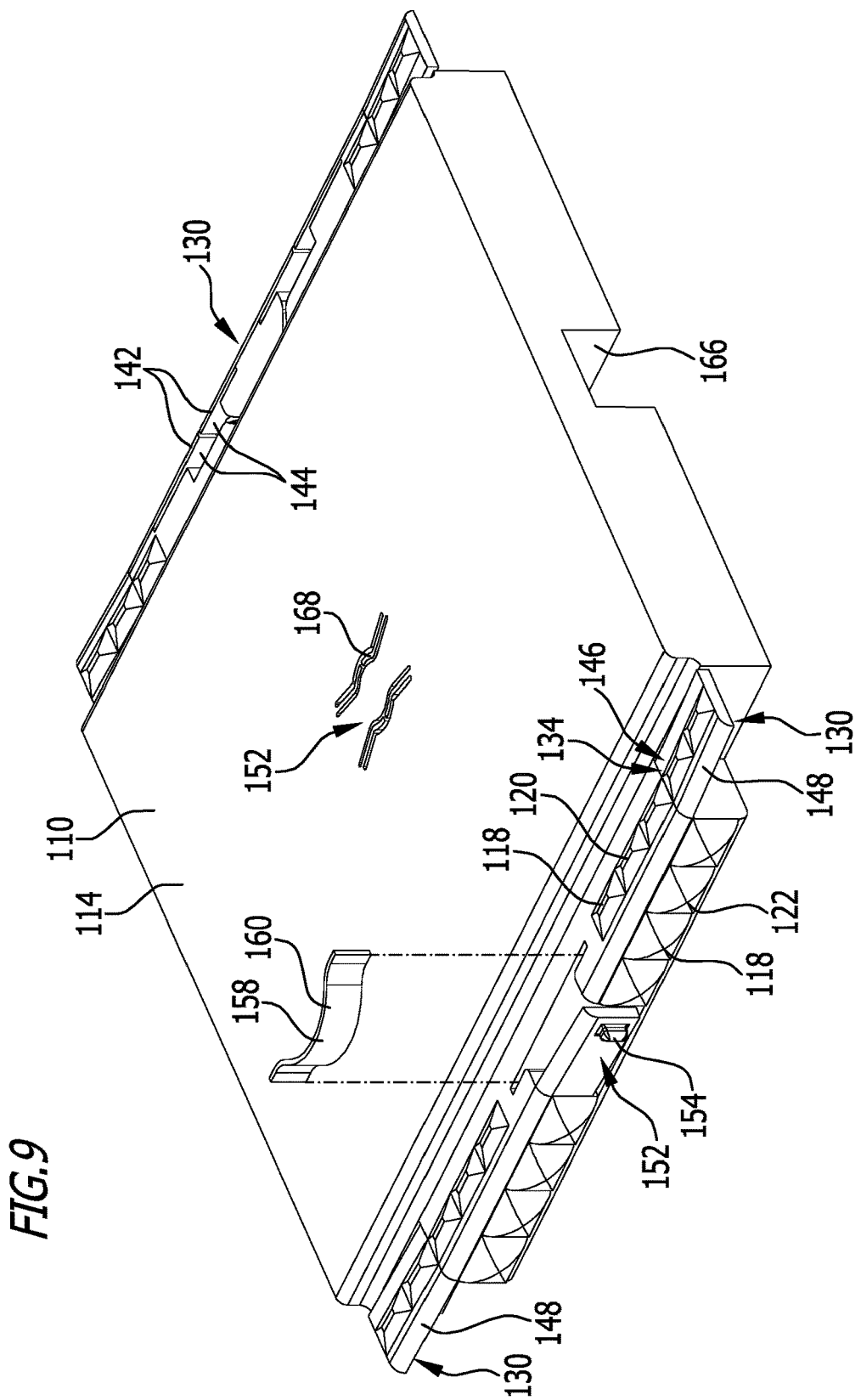
FIG. 9 a schematic perspective illustration of the sliding body and of a spring element of a latching device of the guide device that is yet to be inserted.

To this end in particular, the spring element 158 is insertible into an associated spring seating 162 of the base body 114 of the sliding body 110 (see FIG. 9).

The latch seating 156 is, for example, in the form of a notch 164 in one of the contact surfaces 108 of the guide rail 102.

Preferably, the guide rail 102 comprises a plurality of such notches 164 so that the sliding body 110 is fixable in latching manner to the guide rail 102 in different positions.

As an alternative or in addition thereto, provision may be made for the latching device 152 to comprise one or more latching projections 154 which are arranged on the guide rail 102.

The latching projections 154 can be formed by suitable shaping of the guide rail 102 for example or be arranged on the guide rail 102, for example fixed by reforming with a wobbling tool.

The latching projections 154 of the guide rail 102 are distributed along the guide direction 112 for example and are arranged substantially centrally between the seating sections 104 on the rail back 106 of the guide rail 102.

In particular, the latching projections 154 project from the rail back 106 in the direction of the sliding body 110.

Figure 11:
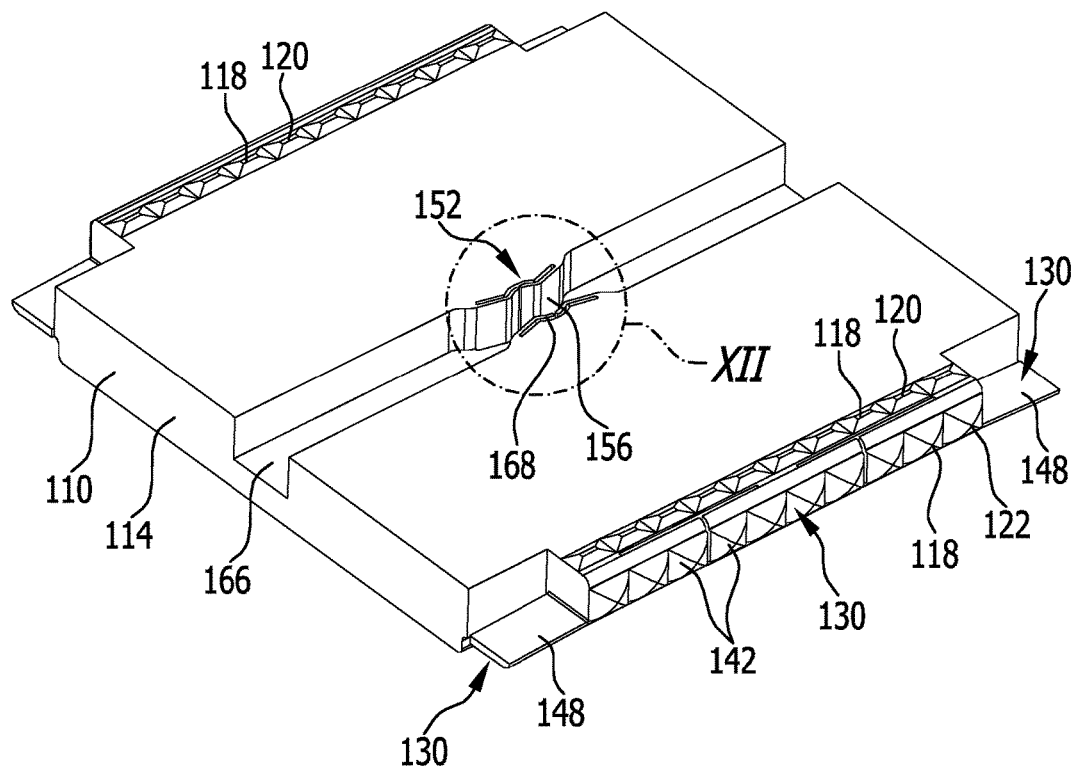
FIG. 11 a schematic illustration of a lower surface of the sliding body and a latching device arranged thereon.
Figure 12:
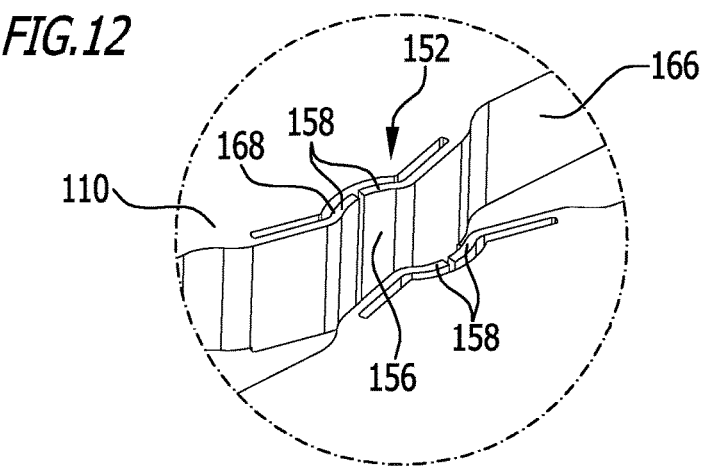
FIG. 12 an enlarged illustration of the region XII in FIG. 11.

As can be derived from FIGS. 1, 11 and 12 in particular, the sliding body 110 comprises a latch channel 166 which comprises a latch seating 156 for the purposes of accommodating a latching projection 154.

In particular, the latch seating 156 is in the form of a latching section 168 of the latch channel 166.

Hereby for example, the latch seating 156 is formed by two or more spring elements 158 of the latch seating 156 between which a latching projection 154 is fixable in latching manner.

The spring elements 158 are formed by suitable shaping of the base body 114 of the sliding body 110 for example and are arranged on mutually opposite sides of the latch channel 166. In the normal state of the guide device 100 (the unlatched state), the spacing between the two spring elements 158 is preferably smaller than an outer diameter of a latching projection 154 of the guide rail 102. The spring elements 158 of the latch seating 156 are thus moveable apart by means of the latching projection 154 when the latching projection 154 is moved into the latch seating 156. The latching projection 154 is then receivable in the latch seating 156 in a recess of the spring elements 158 which is substantially complementary to the latching projection 154 in order to finally lock the sliding body 110 relative to the guide rail 102.

The latching section 168 is preferably arranged centrally in the latch channel 166 taken with reference to the guide direction 112. A central latching process can thereby be ensured for the purposes of locking the sliding body 110 relative to the guide rail 102 in a stable manner.

Figure 13:
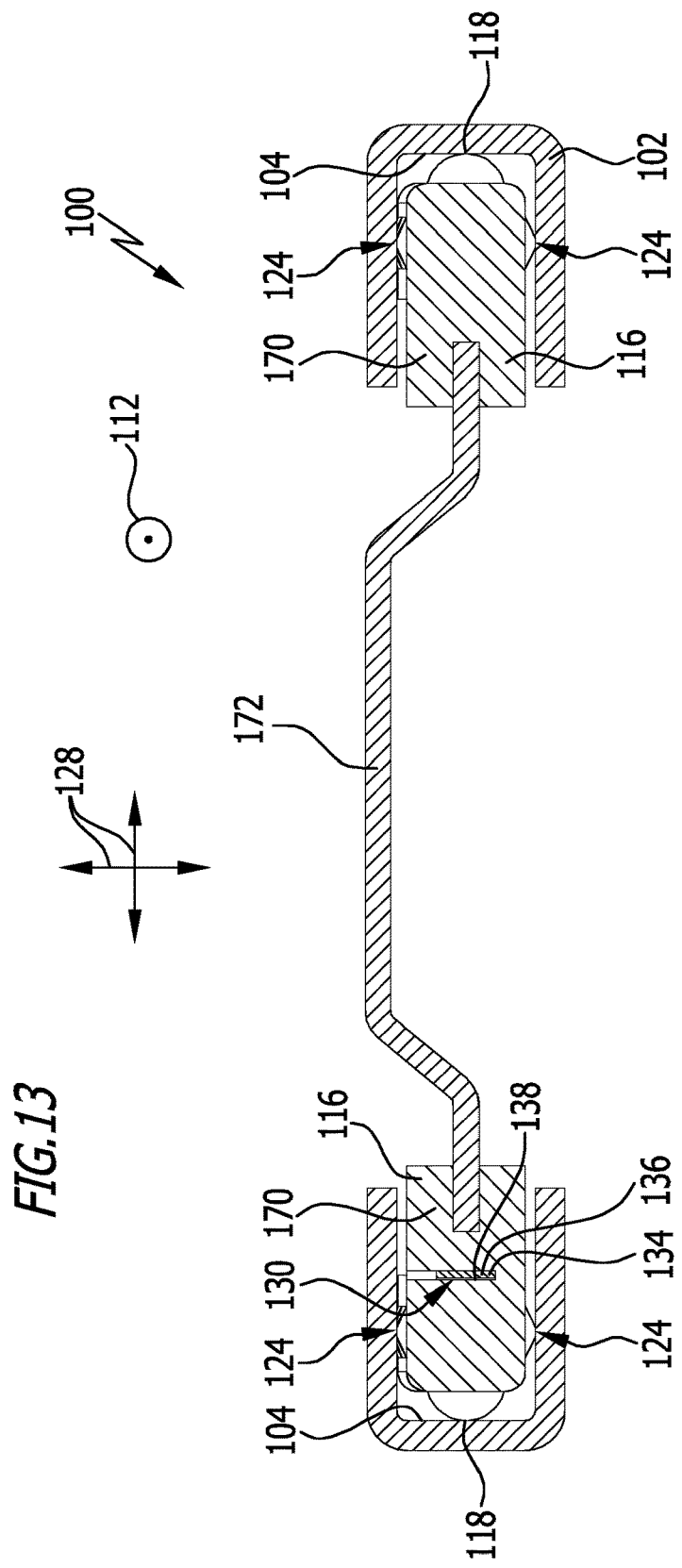
FIG. 13 a schematic cross section corresponding to FIG. 4 through a second embodiment of a guide device in which there are provided two sliding elements of the sliding body which are connected to one another by means of a connecting element.

A second embodiment of a guide device 100 that is illustrated in FIG. 13 differs from the first embodiment illustrated in FIGS. 1 to 12 substantially in that, instead of a one-piece base body 114, the sliding body 110 comprises two mutually spaced sliding elements 170 on which the sliding surfaces 118 are arranged.

The sliding elements 170 are connected to one another by means of a connecting element 172.

Preferably, the guide rail 102 is likewise in two-part form.

In particular, a rail back 106 of the guide rail 102 for connecting the seating sections 104 to one another is preferably not provided.

For example, the connecting element 172 can be formed from a material differing from that of the sliding elements 170.

In particular, provision may be made for the sliding elements 170 to be in the form of injection moulded plastics material components 116 and be moulded onto the connecting element 172.

Each of the sliding elements 170 comprises a complete pair 124 of sliding surfaces 118 in which the sliding surfaces 118 are arranged on mutually opposite sides of the same sliding element 170.

Furthermore, each sliding element 170 comprises sliding surfaces 118 which form a pair 124 of mutually opposite sliding surfaces 118 together with the sliding surfaces 118 of the respective other sliding element 170.

In all other respects, the second embodiment of the guide device 100 that is illustrated in FIG. 13 corresponds in regard to the construction and functioning thereof with the first embodiment illustrated in FIGS. 1 to 12 and so to that extent reference is made to the preceding description thereof.

Figure 14:
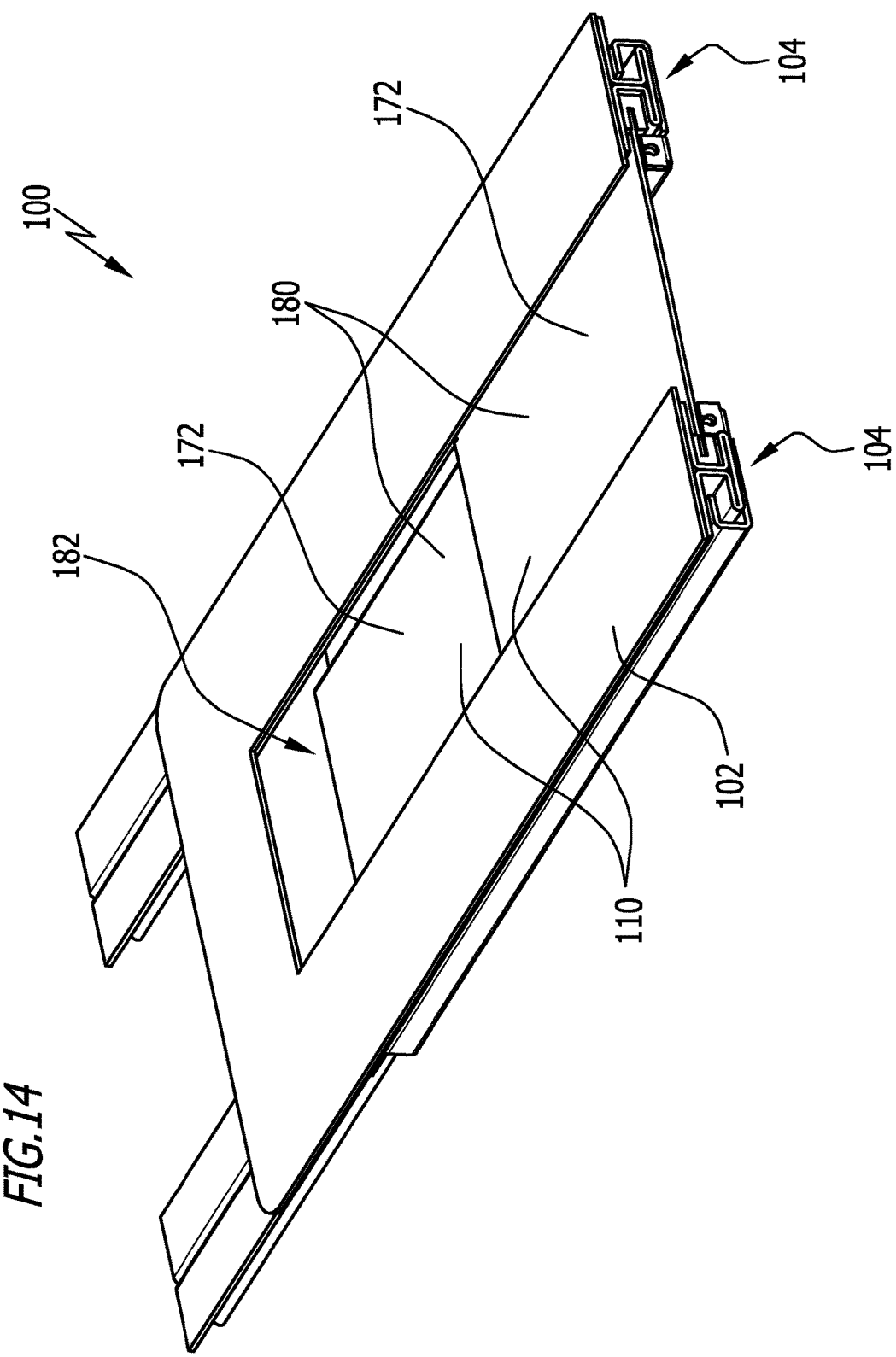
FIG. 14 a schematic perspective illustration of a third embodiment of a guide device in which there are provided two sliding bodies each having two sliding elements, wherein each sliding body forms a closure element for closing an access opening, wherein a sliding body comprising a pair of mutually remote sliding surfaces and also a sliding body comprising a pair of mutually facing sliding surfaces are provided.
Figure 15:
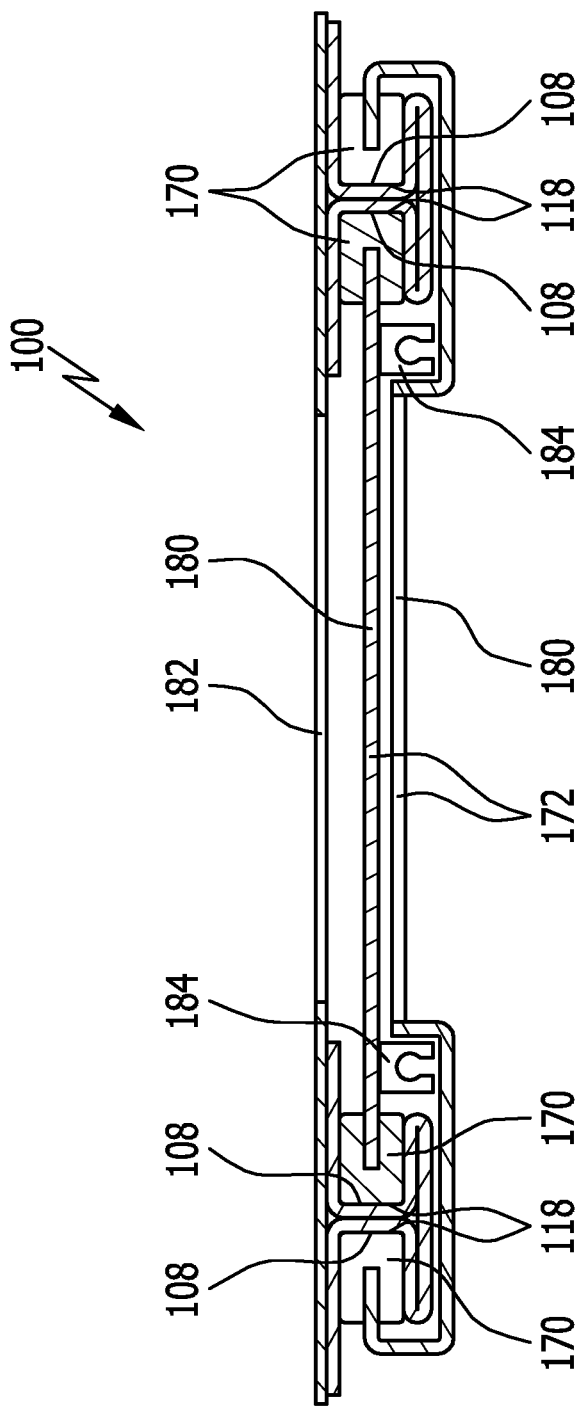
FIG. 15 a schematic cross section through the third embodiment of the guide device depicted in FIG. 14.

A third embodiment of a guide device 100 that is illustrated in FIGS. 14 and 15 differs from the second embodiment illustrated in FIG. 13 substantially in that the guide rail 102 comprises two substantially I-shaped seating sections 104. Contact surfaces 108 for two sliding bodies 110 are formed by means of the seating sections 104.

In particular, there is provided a sliding body 110 which comprises mutually remote sliding surfaces 118. Consequently, the associated contact surfaces 108 of the guide rail 102 are arranged such as to face each other. This sliding body 110 forms a first closure element 180 for the guide device 100.

A further sliding body 110 has a pair 124 of mutually facing sliding surfaces 118 which are accordingly moveable into engagement with a pair 126 of mutually remote contact surfaces 108 of the guide rail 102. This sliding body 110 embraces the seating sections 104 of the guide rail 102 in a substantially C-shaped manner.

The further sliding body 110 also forms a closure element 180 and in particular, a second closure element 180.

In particular, the two closure elements 180 serve for closing an access opening 182 which is formed, in particular, in the guide rail 102.

Hereby in particular, the access opening 182 is coverable by means of connecting elements 172 of the sliding bodies 110 in the form of closure elements 180.

The two sliding bodies 110 of the third embodiment of the guide device 100 that is illustrated in FIGS. 14 and 15 are moveable relative to each other.

Preferably, the two sliding bodies 110 are mounted on the guide rail 102 such as to be moveable independently of one another.

However, provision could also be made for the guide device 100 to comprise a coupling device 184 for mechanically coupling the two sliding bodies 110 to one another. Such a coupling device 184 may comprise a (not illustrated) spring device or latching device for example.

Upon the actuation of one of the sliding bodies 110, the coupling device 184 can, in particular, serve to simultaneously actuate the other sliding body 110 for moving it from an open position into a closed position or from a closed position into an open position for example.

The sliding bodies 110 are preferably arranged in different planes and are thus moveable past one another.

In all other respects, the third embodiment of a guide device 100 that is illustrated in FIGS. 14 and 15 corresponds in regard to the construction and functioning thereof with the second embodiment illustrated in FIG. 13 and so to that extent reference is made to the preceding description thereof.

Figure 16:
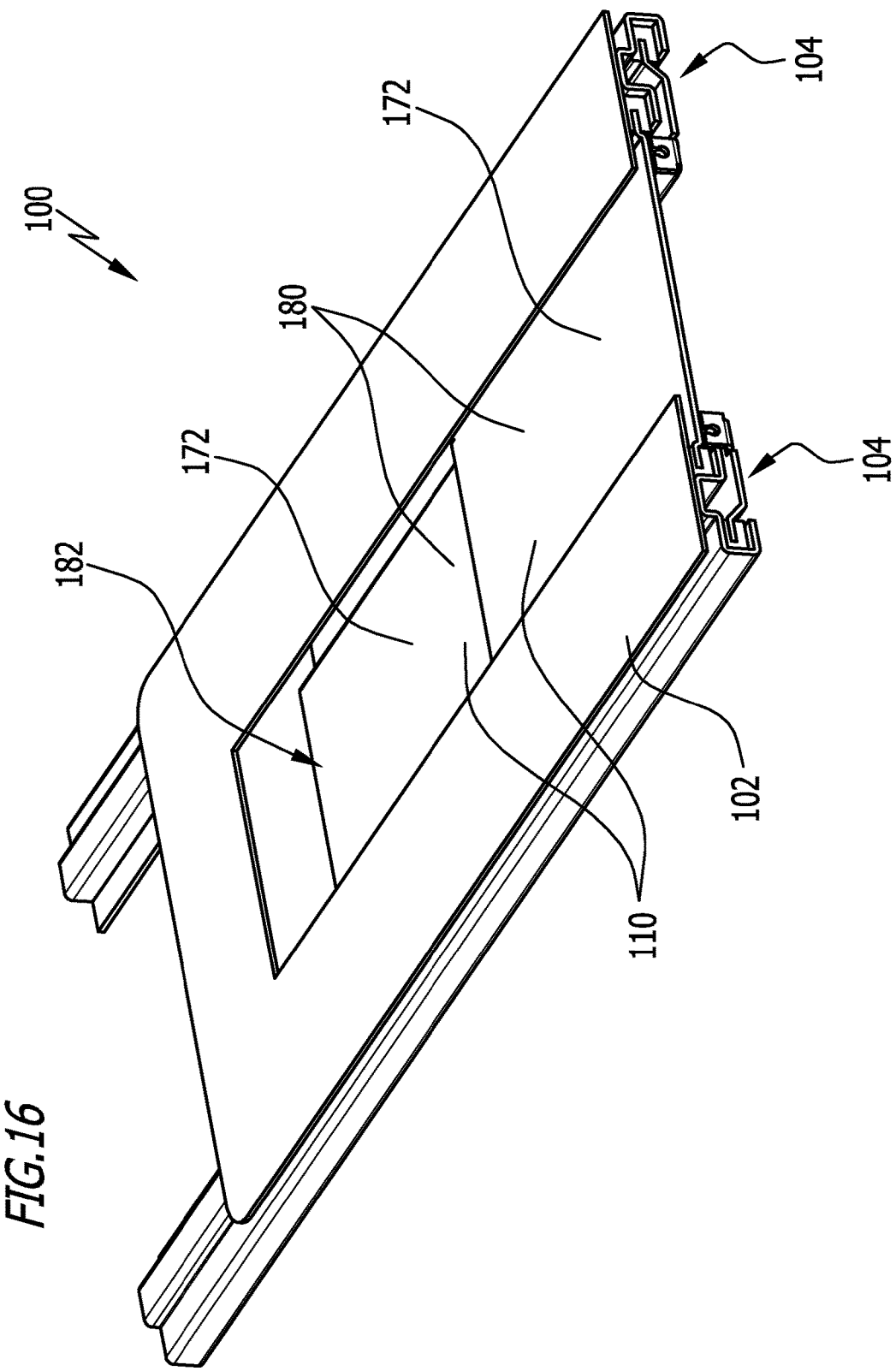
FIG. 16 a schematic perspective illustration of a fourth embodiment of a guide device corresponding to FIG. 14 in which there are provided two sliding bodies which comprise exclusively pairs of mutually remote sliding surfaces.
Figure 17:
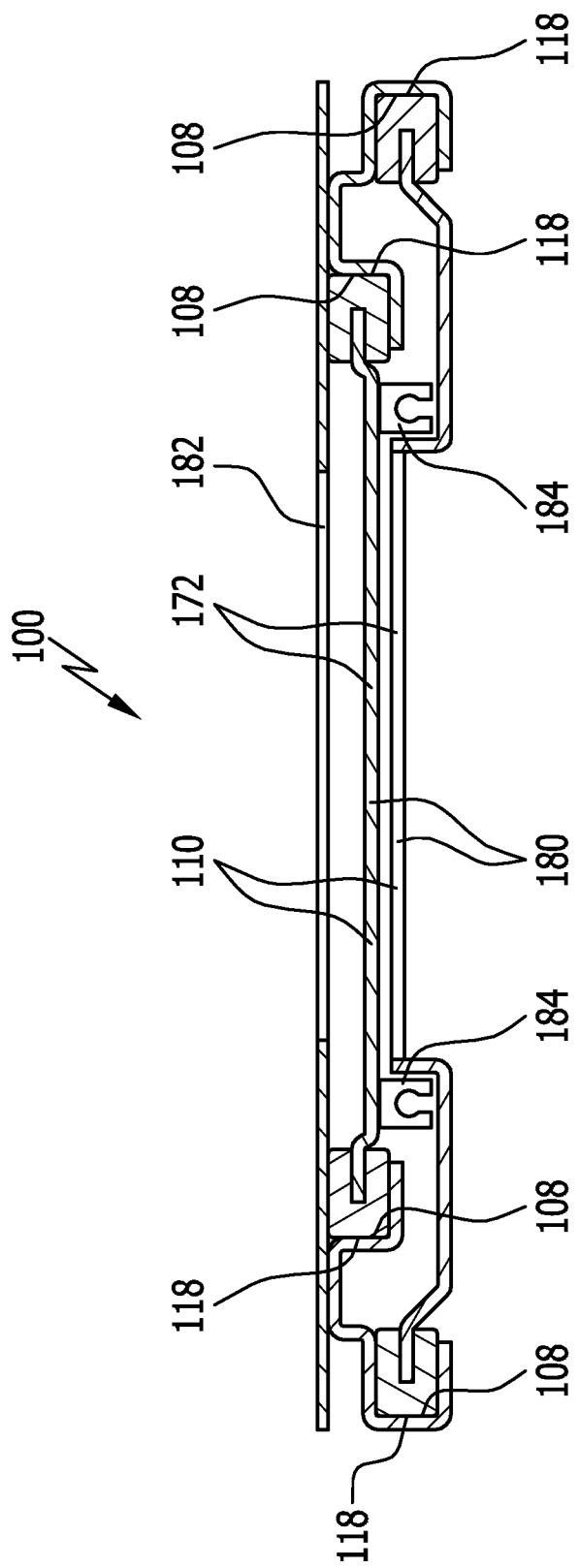
FIG. 17 a schematic cross section corresponding to FIG. 15 through the fourth embodiment of the guide device according to FIG. 16.

A fourth embodiment of a guide device 100 that is illustrated in FIGS. 16 and 17 differs from the third embodiment illustrated in FIGS. 14 and 15 substantially in that the guide rail 102 comprises seating sections 104 which exclusively form pairs 126 of mutually facing contact surfaces 108. In correspondence therewith, the sliding bodies 110 exclusively comprise pairs 124 of mutually remote sliding surfaces 118.

In all other respects, the fourth embodiment of a guide device 100 that is illustrated in FIGS. 16 and 17 corresponds in regard to the construction and functioning thereof with the third embodiment illustrated in FIGS. 14 and 15 and so to that extent reference is made to the preceding description thereof.

The invention claimed is:

1. Guide device comprising a guide rail and a sliding body which is displaceable in sliding manner on the guide rail along a guide direction,
    wherein the sliding body comprises at least one pair of mutually oppositely located sliding surfaces with which the sliding body rests on at least one pair of mutually oppositely located contact surfaces of the guide rail,
    wherein the sliding body comprises a pressing device by means of which the at least one pair of sliding surfaces of the sliding body is pressable onto the at least one pair of contact surfaces of the guide rail,
    wherein the sliding body comprises a base body which is formed in one-piece, and
    wherein one or more pairs of sliding surfaces are arranged on the base body of the sliding body.

2. A guide device in accordance with claim 1, wherein the pressing device comprises one or more spring elements by means of which the at least one pair of sliding surfaces of the sliding body is pressable onto the at least one pair of contact surfaces of the guide rail.

3. A guide device in accordance with claim 2, wherein one or more spring elements are in the form of insert parts for the purposes of insertion into or clamping in the base body of the sliding body.

4. A guide device in accordance with claim 2, wherein one or more spring elements are formed by a process of shaping a resilient section of the base body of the sliding body.

5. A guide device in accordance with claim 2, wherein one or more spring elements are in the form of insert parts for the purposes of insertion into and clamping in the base body of the sliding body.

6. A guide device in accordance with claim 1, wherein the base body comprises a basic section and one or more pressing sections of the pressing device which are moveable automatically relative to the basic section.

7. A guide device in accordance with claim 1, wherein the base body is in the form of an injection moulded plastics material component.

8. A guide device in accordance with claim 1, wherein at least one sliding surface of at least one pair of sliding surfaces is formed by one or more sliding points or one or more sliding lines.

9. A guide device in accordance with claim 1, wherein at least one pair of sliding surfaces of the sliding body comprises mutually remote sliding surfaces.

10. A guide device in accordance with claim 1, wherein at least one pair of sliding surfaces of the sliding body comprises mutually facing sliding surfaces.

11. A guide device in accordance with claim 1, wherein the guide rail comprises one or more substantially C-shaped seating sections.

12. A guide device in accordance with claim 1, wherein the sliding body comprises a plurality of pairs of sliding surfaces which are arranged opposite each other with respect to different spatial directions.

13. A guide device in accordance with claim 1, wherein the sliding body comprises a plurality of sliding elements which respectively comprise just one sliding surface of a pair of sliding surfaces or which respectively comprise one or more pairs of sliding surfaces.

14. A guide device in accordance with claim 1, wherein the guide device comprises a latching device by means of which the sliding body is fixable relative to the guide rail in one or more latching positions.

15. A guide device in accordance with claim 14, wherein the base body comprises a latching projection which is deflectable by means of a spring element of the latching device.

16. A guide device in accordance with claim 14, wherein the base body comprises a latch seating in which a latching projection of the guide rail is receivable.

17. A guide device in accordance with claim 1, wherein the base body comprises a basis section and one or more pressing sections of the pressing device which are deflectable automatically relative to the basic section.

18. A guide device in accordance with claim 1, wherein at least one sliding surface of at least one pair of sliding surfaces is formed by one or more sliding points and one or more sliding lines.

19. A guide device in accordance with claim 1, wherein the sliding body comprises a plurality of sliding elements which respectively comprise just one sliding surface of a pair of sliding surfaces and which respectively comprise one or more pairs of sliding surfaces.

* * * * *